United States Patent [19]

Moriya et al.

[11] Patent Number: 4,877,841

[45] Date of Patent: Oct. 31, 1989

[54] GRAFT POLYMERIZATION PREFORMER AND METHOD OF MANUFACTURING THE SAME

[75] Inventors: Yasuo Moriya; Nobuyoshi Suzuki; Hiroshi Goto, all of Aichi, Japan

[73] Assignee: Nippon Oil and Fats Co., Ltd., Tokyo, Japan

[21] Appl. No.: 149,746

[22] Filed: Jan. 29, 1988

[30] Foreign Application Priority Data

| Jan. 31, 1987 | [JP] | Japan | 62-21127 |
| May 11, 1987 | [JP] | Japan | 62-114021 |
| Aug. 10, 1987 | [JP] | Japan | 62-199612 |
| Aug. 10, 1987 | [JP] | Japan | 62-199615 |
| Aug. 10, 1987 | [JP] | Japan | 62-199618 |

[51] Int. Cl.$^4$ .................. C08F 255/02; C08F 255/04; C08F 255/06; C08F 255/08
[52] U.S. Cl. .................... 525/286; 525/277; 525/263; 525/80; 525/303; 525/913
[58] Field of Search .................. 525/286, 277, 303

[56] References Cited

U.S. PATENT DOCUMENTS 4,753,990 6/1988 Moriya et al. .............. 525/94
4,774,293 9/1988 Beijleveld et al. .............. 525/298

FOREIGN PATENT DOCUMENTS 60011349 1/1985 Japan.

OTHER PUBLICATIONS

Chem. Abstracts, vol. 103, 1985-7265U-Polyolefin Mixtures-Showa.
Chem. Abstracts, vol. 107, 1987-23831p. -Prep of Block & Crafts-Suzuki.

Primary Examiner—Carman J. Seccuro
Attorney, Agent, or Firm—Flynn, Thiel, Boutell & Tanis

[57] ABSTRACT

Resin compositions obtained by causing copolymerization obtained by causing copolymerization of particular radial (co-and/or) polymerizable organic peroxide and vinyl monomer in particular ethylene (co-and/or) polymers and that it is a best way to use a water suspension in the manufacture.

18 Claims, No Drawings

GRAFT POLYMERIZATION PREFORMER AND METHOD OF MANUFACTURING THE SAME

BACKGROUND OF THE INVENTION

1. Field of the Invention

This invention relates to a graft polymerization preformor, which is useful as adhesive, coating agent, quality improver, microdispersion promoter, polymer alloy former, functional molding material, agent for providing solubility to polymer, etc. and permits a high graft efficiency to be obtained.

2. Prior Art

Heretofore, ethylene (co-and/or) polymers have been used extensively owing to their excellent characters, and also there are attempts to improve their characters and use them in new fields.

For example, low density ethylene polymers have been used as molding material because of their moldability and satisfactory physical and chemical properties of their product.

Also, it has been in practice to mix vinyl polymers, e.g., polystyrene, with low density ethylene polymers as molding material, in order to improve the rigidity, dimensional stability, printing property, etc. of the low density ethylene polymers.

Further, it is well known in the art that opoxy-group-containing olefin copolymers provide satisfactory adhesive force as adhesive to bond together metal and plastic material due to their polarity. Further, since they have elasticity and reactive properties, they are used as con-. densation polymers; particularly, they are used as impact improving agents by being reacted with engineering plastics.

Further, since the ethylene-(metha-and/or) acrylic ester copolymers and α-olefin-vinyl ester copolymers have excellent flexibility, weather-proof proper property and shock resistance, they are extensively used as molding material, and α-olefin-vinyl ester copolymers are also broadly used for hot-melt adhesives. Further, recently there have been attempts to use both copolymers as shock resistance improving agents for engineering plastics.

Further, since ethylene-propylene copolymer rubber and ethylene-propylene-diene copolymer rubber have excellent rubber elasticity, flexibility, coldness-proof property and weather-proof property, they are extensively used as rubber material, and also recently there are attempts to use them as shock resistance improving agents for engineering plastics.

However, since olefin (co-and/or) polymers and vinyl polymers are not satisfactorily soluble to each other, it is not in practice to incorporate more than 10% by weight of vinyl copolymer. Usually, vinyl polymer is incorporated only by 0.2 to 5% by weight.

Even where such a small quantity of vinyl copolymer is mixed, the shock resistance of the mixtures is reduced due to the unsatisfactory mutual solubility of the two resins, and also deteriorated appearance is liable to occur.

Further, when ethylene copolymers are used as shock resistance improving agent, sufficient shock resistance improvement effect can not be obtained because of low mutual solubility and dispersion property.

For example, in case of the opoxy-group-containing olefin copolymer, the scope of applications is limited to materials which can react with epoxy group. Therefore, it has been liable that sufficient adhesive force can not be obtained with materials which do not react with epoxy group, e.g., vinyl copolymers or sufficient shock resistance can not be obtained due to low dispersion force with respect to materials.

Therefore, there have been attempts to increase the solubility with engineering plastics.

For example, there have been attempts to increase the solubility with the engineering plastics by increasing the proportion of ethylene-(metha-and/or) acrylic ester copolymers and αolefin-vinyl ester copolymer with respect to (metha-and/or) acrylic ester or vinyl ester. Further, it has been attempted to introduce functional groups such as epoxy group, carboxyl group and acid anhydride group for reaction with residual functional groups of engineering plastics, particularly, condensation engineering plastics to increase the solubility and improve the shock resistance improvement effect.

In the meantime, it is well-known in the art that graft copolymers, in which a polymer having a high solubility with other resins and a functional polymer are chemically combined in a molecule, is preferred to improve the solubility with respect to other resins.

Generally, as a method of graft combining a vinyl polymer with olefin (co-and/or) polymer, there has been proposed olefin (co-and/or) polymer, which is obtained by graft polymerizing vinyl monomer, e.g., styrene polymer, with olefin (co-and/or) polymer by irradiation with ionizable radiation. This method provides considerable effects for causing uniform dispersion of vinyl copolymer in olefin (co-and/or) polymer.

As further well-known method, there is a liquid graft polymerization method making use of such solvent as xylene or toluene. Also, there is an emulsification graft polymerization method.

Further, it has been proposed to impregnate olefin (co-and/or) polymer particles with vinyl monomers and cause polymerization of the resultant system using an aqueous suspension (as disclosed in Japanese Patent Publication Sho 58-51010 and Japanese Patent Publication Sho 58-53003. According to this method, in the polymerized resin composition, vinyl polymer is uniformly mixed. With this method, satisfactory results can be obtained in comparison to other methods.

However, the prior art method for causing graft coupling of vinyl polymers to olefin (co-and/or) polymers is not fully satisfactory.

More specifically, the method of irradiation of ionizable radiant rays is based on a special process of a radiation graft polymerization process. Therefore, this method has problems in economy and encounters difficulties in putting it into practice. Further, in this method there is a limitation in the amount of vinyl monomers to be introduced.

Further in the solution graft polymerization process, polymerization is done in a state, in which the system to be graft polymerized is diluted in a large quantity of solvent, from the standpoint of the solubility of the olefin (co-and/or) polymer, there is less opportunity of contact of vinyl monomers, polymerization initiators, and olefin (co-and/or) polymers with one another, and generally the reaction efficiency of vinyl monomers is low. Further, there are complicated after-treatment steps, which is economically disadvantageous. Further, there is an emulsified graft polymerization process. In this case, the reaction is limited only to the on-surface reactions of olefin (co-and/or) polymer particles.

In the process of polymerization in a water suspension, the graft efficiency of the resin composition obtained by this process is low. Therefore, vinyl polymer particles which have been uniformly dispersed at the end of the completion of polymerization, are liable to be aggregated secondarily due to heating in the secondary processing or contact with the solvent, thus giving rise to problems when using the obtained resin composition as microdispersion promoters, compatibilizers of polymer alloy and agents for providing polymer solubility.

OBJECT OF THE INVENTION

A primary object of the invention is to increase the graft efficiency of the prior art olefin (co-and/or) polymers and vinyl polymers. The present invention is predicated on the findings that resin compositions obtained by causing copolymerization obtained by causing copolymerization of particular radical (co-and/or) polymerizable organic peroxide and vinyl monomer in particular olefin (co-and/or) polymers and that it is a best way to use a water suspension in the manufacture.

DETAILED DESCRIPTION OF THE INVENTION

According to the invention, there is provided a graft polymerization preformer obtainable by causing copolymerization, in 100 parts by weight of ethylene (co-and/or) polymer, of 5 to 400 parts by weight of one or more vinyl monomers selected from a group consisting of vinyl aromatic monomers, (metha-and/or) acrylic ester monomers, (metha-and/or) acrylonitrile and vinyl ester monomers and a mixture of one or more radical (co-and/or) polymerizable organic peroxides represented by a formula.

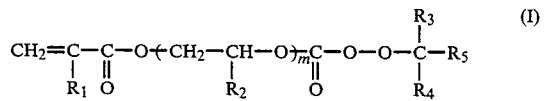

Where $R_1$ represents a hydrogen atom or an alkyl group with a carbon number of 1 to 2, $R_2$ a hydrogen atom or a methyl group, $R_3$ and $R_4$ respective alkyl groups with carbon numbers of 1 to 4, $R_5$ an alkyl, phenyl or alkyl-substituted phenyl group with a carbon number of 1 to 12 or a cycloalkyl group with a carbon number of 3 to 12, and m is 1 or 2, or a formula.

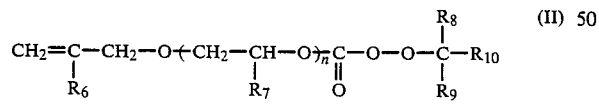

Where $R_6$ represents a hydrogen atom or an alkyl group with a carbon number of 1 to 4, $R_7$ a hydrogen atom or a methyl group, $R_8$ and $R_9$ respective alkyl groups with carbon number of 1 to 4, $R_{10}$ an alkyl phenyl or alkyl-substituted phenyl group with carbon number of 1 to 12 or cycloalkyl group with carbon number of 3 to 12, and n being 0, 1 to 2, said mixture being incorporated in 0.1 to 10 parts by weight with respect to 100 parts by weight of said vinyl monomer or monomers, said graft polymerization preformer containing 20 to 95% by weight of ethylene (co-and/or) polymer and 80 to 5% by weight of vinyl copolymer, said vinyl copolymer containing 0.01 to 0.73% by weight of active oxygen.

According to the invention, there is also provided a method of manufacturing a graft polymerization former comprising the steps of suspending 100 parts by weight of ethylene (co-and/or) polymer in water, adding to the resultant suspension a solution obtained by dissolving in 5 to 400 parts by weight of one or more vinyl monomers selected from a group consisting of vinyl acrylic monomers, (metha-and/or) acrylic ester monomers, (metha-and/or) acrylonitrile and vinyl ester monomers and 0.1 to 10 parts by weight with respect to 100 parts by weight of vinyl monomers of mixture of one or more radical (co-and/or) polymerizable organic oxides represented by formula I or II and radical (co-and/or) polymerizable organic peroxide with a decomposition temperature of 40° to 90° C. for obtaining a half reduction period of 10 hours such that it constitutes 0.01 to 5 parts by weight of the sum of said vinyl monomers and radical (co-and/or) polymerizable organic peroxide, heating the resultant mixture under a condition that the decomposition of said radical polymerization initiator does not substantially take place to impregnate said ethylene (co-and/or) polymer with vinyl monomers, radical (co-and/or) polymerizable organic peroxide and radical polymerization initiator, and elevating, when the content of free vinyl monomers, radical (co-and/or) polymerizable organic oxide and radical initiator is reduced to be 50% by weight or less of the initial value, the temperature of said water suspension to cause copolymerization of said vinyl monomers and radical (co-and/or) polymerizable organic oxide in said ethylene (co-and/or) polymer.

The low density ethylene polymer according to the invention has a density of 0.910 to 0.935 g/cm, and its specific examples are ethylene polymer obtained by the high pressure polymerization process and copolymers of ethylene and α-olefin for density control, e.g., propylene butene-1, pentene-1, etc.

The low density ethylene polymer may be in the form of pellets with diameters of 1 to 5 m or in powdery form. These shapes may be suitably selected according to the proportion of low density ethylene polymer in graft polymerization preformer. For example, where the low density ethylene polymer in the graft polymerization preformer is 50% by weight or above, pellets are suited. If it is less than 50% by weight, it may be in the powder form.

The epoxy-group-containing ethylene copolymer according to the invention is obtained through copolymerization of ethylene and (metha-and/or) acrylic glycidyl.

(Metha-and/or) acrylic glycidyl is incorporated for copolymerization in 0.5 to 40% by weight, preferably 2 to 20% by weight. If the ratio is less than 0.5% by weight, sufficient effect can not be obtained when the preformer is used as shock resistance promotor. If the ratio exceeds 40% by weight, the fluidity when the preformer is melted is reduced.

When the ratio of (metha-and/or) acrylic glycidyl is less than 40% by weight, it is possible to select for copolymerization one or more members of a group consisting of (metha-and/or) acrylic ester monomers, e.g., (metha-and/or) acrylic methyl and (metha-and/or) acrylic ester, vinyl ester monomers, e.g., vinyl acetate and vinyl propionate, vinyl ether monomers, (metha-and/or) acrylonitrile, vinyl aromatic monomers and carbon monoxide in accordance with the invention.

Examples of the epoxy-group-containing copolymer are ethylene-methacrylic glycidyl copolymer, ethylenevinyl acetate-methacrylic glycidyl copolymer, ethylene-carbon monoxide-methacrylic glycidyl copolymer, ethylene-acrylic glycidyl copolymer and ethylene-vinyl acetate-acrylic glycidyl copolymer. Among these examples, ethylene-methacrylic glycidyl copolymer is most preferred.

The epoxy-group-containing ethylene copolymers noted above may be used in combination.

The epoxy-group-containing ethylene copolymer may be in the form of particles or pellets with diameters ranging from 0.1 to 5 mm. These shapes are suitably selected according to the proportion of epoxy-group-containing ethylene copolymer. If the diameter is excessively large, not only the dispersion is difficult at the time of the polymerization, but also the period of impregnation of vinyl monomer or the like is extended.

Examples of ethylene-(metha-and/or) acrylic ester copolymer are ethylene-(metha-and/or) acrylic methyl copolymer, ethylene-(metha-and/or) acrylic ethyl copolymer and ethylene-(metha-and/or) acrylic butyl copolymer. Of these example, ethylene-acrylic ethyl copolymer is most suited.

In ethylene-(metha-and/or) acrylic ester copolymer, (metha-and/or) acrylic ester copolymer is incorporated in 1 to 50% by weight, preferably 2 to 40% by weight. If the copolymerization ratio is 1% by weight or less, sufficient effect can not be obtained when the preformer is used as shock resistance promoter. If the ratio exceeds 50% by weight, the moldability is reduced.

The shape and proportion of ethylene-(metha-and/or) acrylic ester copolymer are like those of epoxy-group-containing ethylene copolymer.

The ethylene-vinyl ester copolymer according to the invention is obtained through copolymerization of ethylene and one of more vinyl ester monomers selected from a group consisting of vinyl propionate, vinyl acetate, vinyl caprylate, vinyl laurate, vinyl stearate and vinyl trioflouroacetate in the presence of radical polymerization initiator. Of these examples, ethylene-vinyl acetate copolymer is most suited.

The copolymerization ratio of vinyl ester monomers in the ethylene-vinyl ester copolymer is the same as the (metha-and/or) acrylic ester copolymer in the ethylene-(metha-and/or) acrylic ester copolymer.

The shape and proportion of ethylene-vinyl ester copolymer are like those of ethylene-(metha-and/or) acrylic ester copolymer.

The ethylene propylene copolymer rubber or ethylene-propylene-diene copolymer rubber is ethylene-propylene copolymer rubber, which contains 40 to 80% by weight of ethylene and 60 to 20% by weight of propylene and has a Mooney viscosity of 15 to 90, and tertiary copolymerized rubber, which is composed of 40 to 80% of ethylene and 60 to 20% by weight of propylene and contains non-conjugated diene component ethylidene norbornene, 1, 4-hexadiene and dicyclopentadiene. Suitably, its diene content is 4 to 30 in terms of iodinated, and its Mooney viscosity is 15 to 120.

The Mooney viscosity is obtained in conformity to JISK 6300 (100° C.).

These ethylene-propylene copolymer rubber and ethylene-propylene-diene copolymer rubber may be used as their mixtures as well.

To facilitate the impregnation of vinyl monomers and prevent aggregation at the time of suspension polymerization, the particles of ethylene-propylene copolymer rubber or ethlene-propylene-diene copolymer rubber are suitably pellets in a narrow diameter range and with diameters of 2 to 8 mm. If the diameter is excessive, not only the dispersion at the time of the polymerization, but also the speed of impregnation of vinyl monomers is reduced to extend the reaction time.

Specific examples of the vinyl monomer according to the invention are vinyl aromatic monomers, e.g., styrene, nucleus substituted styrene, e.g., methyl styrene, dimethyl styrene, ethyl styrene, isopropyl styrene and chloro-substituted styrene, $\alpha$-substituted styrenes, e.g., $\alpha$-methyl styrene and $\alpha$-methyl styrene, (metha-and/or) acrylic ester monomers, e.g., alkyl ester with a carbon number 1 to 7 of (metha-and/or) acrylic acid, (metha-and/or) acrylonitrile, and vinyl ester monomers e.g., vinyl propionate, vinyl acetate, vinyl caproato, vinyl caprylate, vinyl laurate, vinyl stearate and vinyl trifloroacetate.

Further, it is possible to use halogenated vinyl and vinylidene (particularly, vinyl chloride and vinylidene chloride), vinyl naphthalene, vinyl carbazole, acrylamide, methacrylamide, maleic anhydride, and others. These components may be used either alone or in combination.

Of these compounds, vinyl aromatic monomers and (metha-and/or) acrylic ester monomers are preferred.

Particularly, in application to shock resistance improvement agent for engineering plastics, it is desirable to use what is obtained through (co-and/or) polymerization of mixtures containing 50% or above of vinyl aromatic monomers and (metha-and/or) acrylic ester monomers. The reason is that it has satisfactory solubility to engineering plastics.

Particularly, hydrophilic or solid vinyl monomers are suitably dissolved in monomers soluble with respect to oil when they are used.

The vinyl monomers are suitably incorporated in 5 to 400 parts by weight, preferably 10 to 200 parts by weight, with respect to 100 parts by weight of ethylene (co-and/or) polymer.

If the amount is less than 5 parts by weight, sufficient performance as graft can be difficultly obtained in spite of the fact that the graft after the grafting reaction has a high graft efficiency.

When the amount exceeds 400 parts by weight, the proportion of vinyl monomer, radical (co-and/or) polymerizable organic peroxide and radical polymerization initiator represented by the formula I and II that is not impregnating ethylene (co-and/or) polymer is liable to exceed 50% by weight, thus increasing the amount of free sole vinyl system monomers.

According to Japanese Patent Publication Sho 58-51010 or Japanese Patent Publication Sho 58-53003, it is taught that in the water suspension polymerization process it is necessary that free vinyl monomers are less than 20% by weight in amount.

According to the invention, however, the obtainable graft polymerization preformer has peroxide group in its vinyl polymer molecule and has grafting function. Therefore, sufficiently excellent grafting function can be obtained even if the sum of free vinyl monomer, radical (co-and/or) polymerizable organic peroxide represented by the formula I or II is above 20% by weight, in sofar as its content is less than 50% by weight.

The radical (co-and/or) polymerizable organic peroxide which is used in accordance with the invention, is represented by the formula I or II.

Specific examples of the compound represented by the formula I are t-butylperoxyacryloyloxyethyl carbonate, t-amylperoxyacryloyloxyethyl carbonate, t-hexylperoxyacryloyloxyethyl carbonate, 1, 1, 3, 3-tetramethylethylbutylperoxyacryloyloxyethyl carbonate, cumylperoxyacryloyloxyethyl carbonate, P-isopropylcumylperoxyacryloyloxyethyl carbonate, t-butylperoxymethacryloyloxyethyl carbonate, t-amylperoxymethacryloyloxyethyl carbonate, t-amylperoxymethacryloyloxyethyl carbonate, t-hexylperoxymethacryloyloxyethyl carbonate, 1, 1, 3, 3-tetramethylbutylperoxymethacryloyloxyethyl carbonate, cumylperoxymethacryloyloxyethyl carbonate, p-isopropylcumylperoxymethacryloyloxyethyl carbonate, t-butylperoxyacryloyloxyothyoxyethyl carbonate, t-amylperoxyacryloyloxyethoxyethyl carbonate, t-hexylperoxyacryloyloxyethoxyethyl carbonate, 1, 1, 3, 3-tetramethylbutylperoxyacryloyloxyethoxyethyl carbonate, cumylperoxyacryloyloxyethoxyethyl carbonate, p-isopropylcumylperoxyacryloyloethoxyethyl carbonate, t-butylporoxymethacryloyloxyethoxyethyl carbonate, t-amylperoxymethacryloyloethoxyethyl carbonate, t-hexylperoxymethacryloyloxyethoxyethyl carbonate, 1, 1, 3, 3-tetramethylbutylperoxymethacryloyloxyethoxyethyl carbonate, cumylperoxymethacryloyloxyethyoxyethyl carbonate, p-isopropylcumylperoxymethacryloyloxyethoxyethyl carbonate, t-butylperoxyacryloyloxyisopropyl carbonate, t-amylperoxyacryloyloxyisopropyl carbonate, t-hexylperoxyacryloyloxyisopropyl carbonate, 1, 1, 3, 3-tetramethylbutylperoxyacryloyloxyisopropyl carbonate, cumylperoxyacryloyloxisopropyl carbonate, p-isopropylcumylperoxyacryloyloxyisopropyl carbonate, t-butylperoxymethacryloyloxyisopropyl carbonate, t-amylperoxymethacryloyloxyisopropyl carbonate, t-hexylperoxymethacryloyloxyisopropyl carbonate, 1, 1, 3, 3-tetramethylbutylperoxymethacryloyloxyisopropyl carbonate, 1, 1, 3, 3-tetramethylbutylperoxymethacryloisopropyl carbonate, cumylperoxylmethacryloyloxyisopropyl carbonate, p-isopropylcumylperoxymethacryloyloxyisopropyl carbonate.

Specific examples of the compound represented by the formula II are t-butylperoxyallyl carbonate, t-hexylperoxyallyl carbonate, 1, 1, 3, 3-tetramethylbutylperoxyallyl carbonate, p-menthaneperoxyallyl carbonate, t-butylperoxymethallyl carbonate, t-amylperoxymethallyl carbonate, t-hexylperoxymethallyl carbonate, 1, 1, 3, 3-tetramethylbutylperoxymethallyl carbonate, p-menthaneperoxymethallyl carbonate, cumylperoxymethacryl carbonate, t-amylperoxyallyloxyethyl carbonate, t-hexylperoxyacryloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropoyl carbonate, t-butylperoxymethacryloxyisopropyl carbonate, t-amylperoxymethallyloxyisopropyl carbonate and t-hexylperoxymethallyloxyisopropyl carbonate.

Amount these compounds, t-butylperoxyacryloyloxy ethyl carbonate, t-butylperoxymethacryloyloxyethyl carbonate, t-butylperoxyallyl carbonate and t-butylperoxymethallyl carbonate are preferred.

The radical (co-and/or) polymerizable organic peroxide is incorporated in 0.1 to 10 parts by weight with respect to 100 parts by weight of vinyl monomers.

When the proportion is less than 0.1 parts by weight, the amount of active carbon having the graft polymerization preformer according to the invention is insufficient, so that it is difficult to display sufficient grafting function.

When the amount exceeds 10 parts by weight, radical (co-and/or) polymerizable organic peroxide is inductively decomposed during the polymerization, so that a large amount of gel is generated in the graft polymerization preformer at the instant of the end of polymerization. Further, although the grafting capacity of the graft polymerization preformer is increased, the gel formation capacity is also increased, which is undesired.

With the radical polymerization initiator which is used according to the invention, the decomposition temperature for obtaining a half reduction period of 100 hours (hereinafter referred to as 10-hour half reduction period) is 40° to 90° C., preferably 50° to 75° C. The polymerization according to the invention, has to be done under a condition that radical (co-and/or) polymerizable organic peroxide is not decomposed at all. Meanwhile, the 10-hour half reduction period temperature for radical (co-and/or) polymerizable organic peroxide is 90° to 110° C., the polymerization temperature should be less than 110° C.

If the 10-hour half reduction period temperature of the radical polymerization initiator exceeds 90° C., the polymerization temperature is increased, so that these arises a possibililtiy that the polymerization temperature is increased and radical (co-and/or) polymerizable organic peroxide is decomposed during the decomposition. If the 10-hour half reduction period is less than 40° C., polymerization is initiated during a process of impregnating ethylene (co-and/or) polymer with vinyl monomers. By the term "10-hour half reduction period temperature", is referred to a temperature, at which a polymerization initiator is decomposed by 50% when 10 hours have passed at a certain temperature after addition of 0.1 mol of the polymerization initiator to one liter of benzene.

Specific examples of such radical polymerization initiator are di-isopropylperoxy dicarbonate (40.5° C.), di-n-propylperoxy dicarbonate (40.5° C.), dimyristylperoxy dicarbonate (40.9° C.), di-(2-ethoxyethyl) peroxy dicarbonate (43.4° C.), di(methoxyisopropyl) peroxy dicarbonate (43.5° C.), di(2-ethylhexyl) peroxy dicarbonate (43.5° C.), t-hexylperoxyneodecanoate (44.7° C.), di(3-methyl-3-methoxybutyl) peroxy dicarbonate (46.5° C.), t-butylperoxyneodecanoate (46.5° C.), t-hexylperoxyneohexanoate (51.3° C.), t-butylperoxyneohexanoate (53° C.), 2, 4-dichlorobenzoyl peroxide (53° C.), t-hexylperoxypivalate (53.2° C.) t-butylperoxypivalate (55° C.), 3, 5, 5-tri-methylhexanoyl peroxide (59.5° C.), octanoyl peroxide (62° C.), lauroyl peroxide (62° C.), cumylperoxy octoate (65.1° C.), acetyl peroxide (68° C.), t-butylperoxy-2-ethylhexanoate (72.5° C.), m-toluoyl peroxide (73° C.), benzoyl peroxide (74° C.), t-butylperoxy isobutyrate (78° C.), 1, 1bis (t-butylperoxy) -3, 5, 5-triethylcyclohexane (90° C.). (Figures in parentheses represent 10-hour half reduction period temperature.)

The radical polymerization initiator is used in 0.01 to 5 parts by weight, preferably 0.1 to 2.5 parts by weight, with respect to 100 parts by weight of the sum of vinyl monomer and radical (co-and/or) polymerizable organic peroxide. If the amount used is less than 0.01 parts by weight, perfect polymerization of vinyl monomer and radical (co-and/or) polymerizable organic peroxide can not be obtained. If the amount exceeds 5% weight, it is liable that crosslinking of ethylene (co-and/or) polymers occurs during polymerization and that induced decomposition of radical (co-and/or) polymerizable organic peroxide occurs.

According to the invention, polymerization is done by the usual water suspension polymerization process. Thus, ethylene (co-and/or) polymer and a solution prepared separately by agitatedly dispersing a radical polymerization initiator and a radical (co-and/or) polymerizable organic peroxide in vinyl monomer in water in the presence of a suspension agent used for water suspension polymerization, e.g., a water-soluble polymer such as polyvinyl alcohol, polyvinyl pyrrolidone and methyl cellulose and water-insoluble inorganic compounds such as calcium phosphate and magnesium oxide.

The concentration of the water suspension may be set as desired. Usually, however, the proportion of the reaction components is 5 to 150 parts by weight with respect to 100 parts by weight of water.

According to the invention, the impregnation of ethylene (co-and/or) polymer with the solution noted above is suitably done at as high temperature as possible. However, when the polymerization commences with the decomposition of the radical polymerization initiator at the time of the impregnation, the composition of the graft polymerization preformer that is formed becomes very non-homogeneous. Therefore, the impregnation is usually suitably done at a temperature lower by 5° C. or above than the 10-hour half reduction period temperature of the radical polymerization initiator used.

The sum of free vinyl monomer, radical (co-and/or) polymerization organic peroxide and radical polymerization initiator after the impregnation should be less than 50% by weight, preferably less than 20% by weight, with respect to their initial amount used. If the sum exceeds 50% by weight, the grafting capacity of the graft polymerization performer according to the invention is extremely reduced. The amount of free vinyl monomer, radical (co-and/or) polymerizable organic peroxide and radical polymerization initiator is calculated by sampling a given quantity of water suspension, quickly filtering the sampled liquid using a metal filter of about 300 meshes to separate ethylene (co-and/or) polymer and liquid phase and measuring the quantities of vinyl monomer, radical (co-and/or) polymerizable organic oxide and radical polymerization initiator in the liquid phase.

According to the invention, the polymerization is usually done at a temperature of 30° to 110° C. This is done so in order to prevent the decomposition of radical (co-and/or) polymerizable organic peroxide during the polymerization.

If the temperature exceeds 110° C., the amount of decomposition of radical (co-and/or) polymerizable organic peroxide that is decomposed is increased, which is undesired. The polymerization period is usually suitably 2 to 20 hours.

In the graft polymerization performer according to the invention, the mixed vinyl polymer should contain 0.01 to 0.73% by weight of active oxygen.

If the content of active oxygen is less than 0.01% by weight, the grafting capacity of the graft polymerization preformer is extremely reduced.

If the content exceeds 0.73% by weight, the gel formation capacity is increased, which is also undersired.

The active oxygen content can be calculated by extracting vinyl polymer from the graft polymerization preformer according to the invention by solvent extraction and obtaining the active oxygen content of the vinyl polymer by the iodometric method.

The graft polymerization preformer according to the invention can be grafted by merely heating it. For example, a resin composition having a high grafting efficiency can be obtained by causing thermal fusion using an extruder, an extrusion molder, a mixer or the like.

EFFECTS OF THE INVENTION

The graft polymerization preformer permits a resin composition having a high grafting efficiency to be obtained by mere heating.

It is thus thought that in the resin composition obtained by the heating process the aggregation of vinyl monomer due to the secondary processing is reduced compared to the composition obtained by the prior art water suspension polymer, and it is expected that high effect is obtainable as a compatibilizer between polymers.

Further, the method of manufacturing a graft polymerization preformer according to the invention is a water suspension polymerization process. Therefore, it is possible to readily manufacture a large amount of graft polymerization preformer without need of any particular apparatus.

Further, it is possible to introduce a large quantity of vinyl polymer compared to the prior art method of manufacture.

EXAMPLES AND COMPARATIVE EXAMPLES

Now, the invention will be described in further detail in conjunction with examples.

(EXAMPLE 1)

2,500 g of pure water was charged into a stainless steel autoclave with a volume of 5 l and 2.5 g of polyvinyl alcohol was dissolved as a suspension agent.

Further, 700 g of low density ethylene polymer with a density of 0.925 g/cm (available under a trade name "Miscasene 6-401", by Sumitomo Kagaku Kogyo, with grain size of 3 to 4 mm) was charged and dispersed by agitation. Separately, 1.5 g of benzoyl peroxide (available under a trade name "Niber-B" by Nippon Yushi Co., Ltd., with 10-hour half reduction period temperature of 74° C.) as radical polymerization initiator and 6 g of t-butylperoxymethacryloyloxyethyl carbonate as radical (co-and/or) polymerizable organic peroxide were dissolved in 300 g of vinyl monomer, and the resultant solution was charged into the autoclave, and the resultant solution was agitated.

Then, the autoclave was heated to elevate its temperature to 60° to 65° C., and the system was agitated for one hour, whereby the low density ethylene polymer was impregnated with the vinyl monomer containing the radical polymerization initiator and radical (co-and/or) polymerizable organic peroxide. Subsequently, after confirming that the content of free vinyl monomer, radical (co-and/or) polymerizable organic peroxide and radical polymerization initiator was less than 50% by weight of the initial amount, the temperature was elevated to 80° to 85° C., and the system was held at this temperature for 7 hours to complete polymerization, followed by washing with water and drying to obtain a graft polymerization preformer.

This graft polymerization preformer was rendered into film using a press, and the styrene copolymer content was calculated from polystyrene characteristic absorption of an infrared absorption spectrum of 1,603 cm$^1$.

Further, extraction from this graft polymerization preformer was done at room temperature for 7 days using ethyl acetate to obtain a styrene solution, which was charged into methanol to obtain white powdery styrene polymer.

The active oxygen content in this styrene polymer was measured by the iodometry method, and it was 0.13% by weight. This graft polymerization preformer was subjected to extraction in a Soxhlet extractor with xylene. No part remaining insoluble in xylene was found.

(Reference Example 1)

The graft polymerization preformer obtained in Example 1 was kneaded at 180° C. for 10 minutes using a laboratory plast mill "B-75 Type Mixer" for grafting reaction.

After the grafting reaction, the resultant system was subjected to extraction in a Soxhlet extractor with ethyl acetate to extract non-grafted styrene polymer.

The extracted non-grafted styrene polymer was 3.3% by weight with respect to the total amount.

Thus, the grafting efficiency of the styrene polymer was calculated to be 89% by weight.

Further, in the extraction with xylene, insoluble part in xylene was 17.5% by weight.

This insoluble part in xylene was analyzed by the pyrolysis decomposition gas chromatography to find that the contents of low density ethylene polymer and styrene polymer were respectively 79.0 and 21.0% by weight.

(Compartive Example 1)

A graft polymerization preformer was prepared in the same manner as Example 1 except for that t-butyl-peroxymethacryloyloxyethyl carbonate was used.

With this graft polymerization preformer, the contents of styrene polymer, active oxygen and insoluble part in xylene were measured in the same manner as in Example 1. They were respectively 29.0 and 0% by weight.

The grafting efficiency of this graft polymerization preformer was obtained by causing grafting reaction in the manner as in Reference Example 1.

It was 1% by weight, that is, this graft polymerization preformer had substantially no grafting capacity.

(Comparative Example 2)

A graft polymerization preformer was prepared in the same manner as in Example 1 except for that dicumylperoxide was used in Lieu of t-butylperoxymethacryloyloxyethyl carbonate.

In this case, the contents of styrene polymer, active oxygen and insoluble part in xylene were respectively 29, 0.01 and 0% by weight.

The active oxygen content of 0.01% by weight is thought to be due to the fact that dicumylporoxide extracted with ethyl acetate was dissolved in methanol-/ethyl acetate solvent as re-precipitation solvent and distributed into low density ethylene polymer during the polymerization.

This graft polymerization performer was analyzed in the same manner as in Reference Example 1 to find that the grafting efficiency with respect to low density ethylene polymer and styrene polymer is 6.7% by weight. It was thought that dicumylperoxide substantially acted for inter-molecule bridging of low density ethylene polymer.

Further, insoluble part in xylene content was 35% by weight, composition was 99.0% by weight of low density ethylene polymer and 1.0% by weight of styrene polymer. The non-dissolved ethyl acetate content at the time of the grafting efficiency calculation was 28% by weight.

(Example 2)

A graft polymerization performer was prepared in the same manner as in Example 1 except for that 300 g of methyl methacrylate was used in lieu of 300 g of styrene.

This graft polymerization preformer was analyzed in the same manner as in Example 1 to find a methyl methacrylate polymer content of 26% by weight (the determination based on infrared absorption spectrum being done by 1,720 to 1,730 $cm^{-1}$), an active oxygen content of 0.12% by weight and an insoluble part in xylene content of 0% by weight.

(Reference Example 2)

The graft polymerization preformer obtained in Example 2 was grafted in the same manner as in Reference Example 1.

The grafting efficiency was 53% by weight. 2,500 g of pure water was charged into a stainless steel autoclave with a volume of 5 l, and 25 g of polyvinyl alcohol was dissolved as suspension agent. To the resultant system was added a mixture consisting of 1,000 g of styrene, 5 g of benzoyl peroxide and 20 g of t-butyl-peroxymethacryloyloxyethyl carbonate.

The admixture was subjected to polymerization at 80° to 85° C. for 7 hours to obtain a peroxide-group-containing styrene polymer composition.

5 g of peroxide-group-containing styrene polymer composition was dissolved in benzene.

The resultant solution was then charged into methanol to remove to remove non-copolymerized peroxide, thus obtaining peroxide-group-containing styrene polymer. As a result, substantially the same styrene polymer as in the case of Example with an active oxygen of 0.13% by weight was obtained.

Then, 70 parts by weight of low density ethylene polymer used in Example 1 and 30% by weight of peroxy-group-containing styrene polymer were mixed together for grafting reaction in the manner as in reference Example 1. The grafting efficiency was 0% by weight.

The insoluble part in xylene content was 23% by weight. Of the insoluble part in composition, the low density ethylene polymer and styrene polymer contents were respectively 1 and 99% by weight.

In other words, in this case no grafting reaction occurred, but only inter molecular bridging reaction of styrene polymer occurred.

(Example 3)

A graft polymorization preformer was prepared in the same manner as in Example 1 except for 300 g of vinyl acetate was used in lieu of 300 g of styrene and 20 g of t-butylporoxyallyl carbonate in lieu of 6 g of t-butylperoxymethacryloyloxyethyl carbonate.

This graft polymerization preformer is rendered into film using a press, and the polyvinyl acetate content was determined from carbonyl absorption of 1,720 to 1,730 $cm^{-1}$ of infrared absorption spectrum. It was 28.5% by weight. Thus graft polymerization preformer was subjected to extraction at room temperature for 7 days with methanol to extract polyvinyl acetate. The system was further charged into petroleum ether to obtain polyvinyl acetate powder. The active carbon oxygen of polyvinyl acetate was 0.17% by weight, the Insoluble part in xylene content in the graft polymerization preformer was 1.7% by weight.

(Reference Example 3)

Grafting reaction was caused in the same manner as in Reference Example 1 except that what was obtained in Example 3 was used in lieu of the graft polymerization performer and that methanol was used in lieu of ethyl acetate as extraction solvent for calculating the grafting efficiency. As a result, the grafting efficiency was 65% by weight.

(Example 4)

A graft polymerization preformer was obtained in the manner as in Example 1 except for that 255 g of styrene and 75 g of acrylonitrile were used as vinyl monomer. The composition of the graft polymerization preformer contained 28% by weight of vinyl copolymer as determined from the yield at the time of the completion of polymerization (the yield being that which is in the form of pellets, excluding that which is in the powdery form, which consists of sole vinyl copolymers. The content of active oxygen in the vinyl copolymer as measured in the manner as in Example 1 was 0.13% by weight. The Insoluble part in xylene content was 1% by weight.

(Reference Example 4)

Grafting reaction was caused in the same manner as in Reference Example 1 except that what was obtained in Example 4 was used as graft polymerization preformer. The grafting efficiency was 72% by weight.

(Example 5)

A graft polymerization preformer was obtained in the same manner as in Example 1 except that lauroyl peroxide (available under a trade name "Perroil L" manufactured by Nippon Yushi Co., Ltd. with a 10-hour half reduction period temperature of 62° C. was used in lieu of benzoyl peroxide as radical polymerization initiator and that the polymerization temperature and time were correspondingly set 70° to 75° C. and 9 hours, respectively.

This graft polymerization preformer had a composition containing 29% by weight of styrene polymer, 0.12% by weight of active oxygen contained in styrene polymer and 0% by weight of Insoluble part in xylene.

(Comparative Example 4)

A graft polymerization preformer was obtained in the manner as in Example 1 except for that t-butylperoxybenzoate (available under a trade name "Perbutyl Z" manufactured by Nippon Yushi Co., Ltd. with a 10-hour half reduction period temperature of 104° C.) was used in lieu of benzoyl peroxide as the radical polymerization initiator and that the polymerization temperature and time were correspondingly set to be 120° C. and 6 hours, respectively.

This graft polymerization preformer contained 94% by weight of Insoluble part in xylene. This is thought to be due to presumable decomposition of t-butylperoxymethacryloyloxyethyl carbonate, giving rise to intermolecular bridging.

(Comparative Example 5)

A graft polymerization preformer was obtained in the same manner as in Example 1 except for that the impregnation temperature was changed to 90° C.

This graft polymerization preformer was a mixture of what is in the form of pellets with diameters in a range of 4 to 5 mm and what is in the form of particles with diameters in a range of 1 mm or less. What is in the powdery form was found to be sole styrene polymer as measured from the pyrolysis gas chromatography, and its yield was 232 g. With this graft polymerization preformer, the content of active oxygen in styrene monomer was 0.11% by weight, and the Insoluble part in xylene content was 2% by weight, and the content of styrene polymer, as calculated from the total yield, was 28% by weight.

Grafting reaction was conducted in the same manner as in Reference Example 1. The grafting efficiency was 19% by weight.

(Examples 6 to 9)

Graft polymerization preformers were prepared using low density ethylene polymer, styrene, benzoyl peroxide, t-butylperoxymethacryloyloxyethyl carbonate in quantities as listed in Table 1.

These graft polymerization preformers were subjected to grafting reaction in the same manner as in Reference Example 1, and the grafting efficiency and Insoluble part in xylene content of the resultant grafted system were measured. The results are shown in Table 1.

(Comparative Example 6 to 9)

Graft polymerization preformers were manufactured by using low density ethylene polymer, styrene, benzoyl peroxide and t-butylperoxymethacryloyloxyethyl carbonate as in Example 1 in quantities as shown in Table 2.

Further, these graft polymerization preformers were subjected grafting reaction in the same manner as in Reference Example 1, and the grafting efficiency and Insoluble part in xylene content of the resultant grafted system were measured.

The results are shown in Table 2.

(Comparative Example 10)

A graft polymerization preformer was prepared in the manner as shown in Example 1 except for that cumyl-peroxyneodecanoate (available under a trade name "Percumyl ND" manufactured by Nippon Yushi Co., Ltd. with a 10-hour half reduction period temperature of 36.6° C. was used in lieu of benzoyl peroxide as radical polymer initiator and that the impregnation temperature and time were set to 35° C. and 2 hours, respectively, and to polymerization temperature to 60° C.

This graft polymerization preformer was covered by a transparent resin, and what was in the powdery form, consisting of the sole styrene polymer, reached in amount to 63% by weight of the charged amount of styrene.

This graft polymerization preformer was subjected to grafting reaction in the same manner as in Reference Example 1.

The grafting efficiency was 9% by weight.

(Example 10)

A graft polymerization preformer was obtained through polymerization in the same manner as in Example 1 except for that epoxy-group-containing ethylene polymer (containing 15% by weight of ethylene-methacrylic glycidyl copolymer in the form of pellets) was used as low density ethylene polymer and that the contents of the autoclave were agitated at temperature of 60° to 65° C. for 2 hours in lieu of one hour.

This graft polymerization preformer was rendered into film in the same manner as in Example 1, and the content in the styrene polymer was calculated to be 28.7% by weight.

This graft polymerization preformer was subjected to extraction in the same manner as in Example 1 to obtain styrene polymer, and the active oxygen content was measured to be 0.13% by weight.

Further, this graft polymerization preformer was subjected to extraction in the same manner as in Example 1.

No Insoluble part in xylene content was found.

(Reference Example 5)

The graft polymerization preformer as obtained in Example 10 was subjected to grafting reaction in the same manner as in Reference Example 1.

The product system of the grafting reaction was subjected to extraction in the same manner as in Reference Example 1 with ethyl acetate to extract non-grafted styrene polymer.

The extracted styrene polymer was 6.6% by weight with respect to the total amount.

In the extraction with xylene, the Insoluble part in xylene content was 19.3% by weight. (The grafting efficiency represents the ratio of the grafted polystyrene to the total amount of polymerized polystyrene.)

(Comparative Example 11)

A graft polymerization preformer was manufactured in the manner as in Example 10 except for that t-butylperoxymethacryloyloxyethyl carbonate.

With this graft polymerization preformer, the styrene polymer, active oxygen and Insoluble part in xylene contents were measured in the same manner as in Example 10.

They are respectively 28.5, 0 and 0% by weight.

This graft polymerization preformer was subjected to grafting reaction in the same manner as in Reference Example 1, and the grafting efficiency was obtained.

It was 0% by weight, and there was no grafting capacity at all.

(Comparative Example 12)

A graft polymerization preformer was manufactured in the same manner as in Example 10 except for that dicumyl peroxide was used in lieu of t-butylperoxymethacryloyloxyethyl carbonate.

At this time, the styrene polymer, active oxygen and Insoluble part in xylene contents were respectively 28.5, 0.02 and 0% by weight.

The active oxygen content of 0.02% by weight is thought to be due to the fact that dicumyl peroxide extracted by ethyl acetate is dissolved in methanol ethyl acetate solvent as re-precipitation solvent and distributed in epoxy-group-containing ethylene copolymer during the polymerization.

This graft polymerization preformer was analyzed in the same manner as in Reference Example 1.

The grafting efficiency with respect to epoxy-group-containing ethylene copolymer and styrene polymer was 1.4% by weight.

Substantially no grafting reaction due to dicumyl peroxide occurred.

The Insoluble part in xylene content was 35.6% by weight.

(Example 11)

A graft polymerization preformer was manufactured in the same manner as in Example 10 except for that 300 g of methyl methacrylate was used in lieu of 300 g of styrene.

The content of methyl methacrylate polymer was measured from the yield of this graft polymerization preformer. It was 27.9% by weight.

The active oxygen and Insoluble part in xylene contents were 0.12 and 0.3% by weight.

(Reference Example 6)

The graft polymerization preformer obtained in Example 11 was subjected to grafting in the same manner as in Reference Example 1.

The grafting efficiency of methylmethacrylate polymer was 65.3% by weight.

(Comparative Example 13)

2,500 g of pure water was charged into a stainless steel autoclave with a volume of 5 l, and 2.5 g of polyvinyl alcohol was dissolved as suspension agent.

To the resultant solution was added a mixture consisting of 1,000 g of styrene, 5 g of benzoyl peroxide and 20 g of t-butylperoxymethacryloyloxyethyl carbonate.

The resultant system was subjected to polymerization at 80° to 85° C. for 7 hours to obtain a peroxy-group-containing methyl methacrylate copolymer composition.

5 g of the polymer composition was dissolved in benzene, and then methanol was charged to remove non-copolymerized peroxide, thus obtaining peroxy-group-containing MHA copolymer.

Substantially the same MHA polymer as obtained in Example 10 was obtained, with the active oxygen content in the copolymer being 0.13% by weight.

Then, 70 parts by weight of epoxy-group-containing ethylene copolymer used in Example 10 and 30 parts by weight of the peroxy-group-containing styrene copolymer noted above were mixed together for grafting reaction in the same manner as in Reference Example 1.

The grafting efficiency of the MHA copolymer was 0% by weight, the Insoluble part in xylene content was 27.2% by weight, and the Insoluble part in content was constituted by self-bridged MHA polymer.

In this case, no grafting reaction occurred, and only the inter-molecular bridging of the styrene copolymer occurred.

(Example 12)

A graft polymerization preformer was manufactured in the same manner as in Example 10 except for that 300 g of vinyl acetate was used in lieu of 300 g styrene and 6 g of t-butylperoxyallyl carbonate in lieu of 6 g of t-butylperoxymethacryloyloxyethyl carbonate.

The content of vinyl acetate polymer was measured from the yield of the graft polymerization preformer. It was 28.1% by weight.

This graft polymerization preformer was extracted with methanol at room temperature for 7 days to extract vinyl acetate polymer. The extracted vinyl acetate polymer was charged into petroleum ether to obtain vinyl acetate polymer powder. The active oxygen content of vinyl acetate polymer was 0.15% by weight.

The Insoluble part in xylene content in this graft polymerization performer was 1.3% by weight.

(Reference Example 7)

Grafting reaction was caused in the same manner as in Reference Example 1 except for that what was obtained in Example 12 was used as graft polymerization preformer and methanol was used in lieu of ethyl acetate as extraction solvent for calculating the grafting efficiency.

The grafting efficiency was 65.2% by weight.

(Example 13)

A graft polymerization preformer was obtained in the manner as in Example 10 except for that 225 g of styrene and 75 g of acrylonitrile were used as vinyl monomer.

From the yield of this graft polymerization preformer, the content of styrene-acrylonitrile copolymer was determined to be 27.8% by weight. The active oxygen and Insoluble part in xylene contents in styrene-acrylonitrile copolymer measured in the same manner as in Example 10 were 0.13 and 1% by weight.

(Reference Example 8)

Grafting reaction was caused in the same manner as in Reference Example 1 except for that what is obtained in Example 13 was used as graft polymerization preformer. The grafting efficiency was 72.5% weight.

(Example 14)

A graft polymerization preformer was obtained in the same manner as in Example 10 except for that lauroyl peroxide (available under a trade name "Perroyl L" manufactured by Nippon Yushi Co., Ltd. with a 10-hour half reduction period temperature of 62° C. was used in lieu of benzoyl peroxide as radical polymerization initiator and that the polymerization temperature and time were correspondingly set to 70° to 75° C. and 9 hours, respectively. This graft polymerization preformer had a composition consisting of 28% by weight of styrene polymer, 0.12% by weight of active oxygen content in MHA polymer and 0.2% by weight of Insoluble part in xylene.

(Comparative Example 14)

A graft polymerization preformer was obtained in the same manner as in Example 10 except for that t-butyl-peroxybenzoate (available under a trade name "Perbutyl Z" manufactured by Nippon Yushi, with a 10-hour half reduction period temperature of 104° C. was used in lieu of benzoyl peroxide as radical polymerization initiator and that the polymerization temperature and time were correspondingly respectively set to 120° C. and 6 hours. This graft polymerization preformer contained 95% by weight of Insoluble part in xylene. This is thought to be due to occurrence of inter-molecular bridging with decomposition of t-butylperoxymethacryloyloxyethyl carbonate.

(Example 15)

A graft polymerization preformer was obtained in the same manner as in Example 10 except for that what consisted of 82% by weight of ethylene, 12% by weight of glycidyl methacrylate and 6% by weight of vinyl acetate was used in lieu of epoxy-group-containing copolymer.

From the yield of the graft polymerization preformer, the content of the styrene polymer determined to be 28.7% by weight. The content of active oxygen in styrene monomer as measured in the same manner as in Example 10 was 0.13% by weight.

(Example 16~19)

Graft polymerization preformers were manufactured in the same manner as in Example 10 except for that the amount of epoxy-group-containing ethylene copolymer, styrene, benzoyl peroxide, t-butylperoxymethacryloyloxyethyl carbonate were varied as in Table 3. These graft polymerization preformers were subjected to grafting reaction in the same manner as in Reference Example 1. The grafting efficiency and insoluble part in xylene contents of the resultant grafted systems were measured. The results are as shown in Table 3.

(Comparative Example 15 to 18)

Graft polymerization preformer were obtained in the same manner as in Example 10 except for that the amounts of epoxy-group-containing ethylene copolymer, styrene, benzoyl peroxide and t-butylperoxymethacryloyloxyethyl carbonate were varied as in Table 4. These graft polymerization preformers were subjected to grafting reaction in the same manner as in reference Example 1. The grafting efficiency and insoluble part in xylene content in the resultant grafted systems were measured. The results were as shown in Table 4.

(Comparative Example 19)

A graft polymerization preformer was obtained in the same manner as in Example 10 except for that cumylperoxyneodecanoate (available under a trade name "Percumyl ND" manufactured by Nippon Yushi Co., Ltd. with 10-hour half reduction period temperature of 36.6° C.) was used in lieu of benzoyl peroxide as radical polymerization initiator and that correspondingly the impregnation temperature and time were set to 35° C. and 2 hours and the polymerization temperature to 60° C. This graft polymerization preformer had its surface covered by a transparent resin. Further, what was in the powdery form, consisting of sole styrene polymer (impregnated graft polymerization preformer being in the form of pellets) reached 63% by weight of the charged amount of styrene.

This graft polymerization performer was subjected to grafting reaction in the same manner as in reference Example 1. The grafting efficiency was 9.4% by weight.

(Example 20)

A graft polymerization preformer was obtained through polymerization caused in the same manner as in Example 1 except for that ethylene-ethyl acrylate copolymer (available under a trade name "Nisseki Rekusuron EEAA-4200" manufactured by Nippon Sekiyu Co., Ltd. containing 20% by weight of and in the form of pellets) was used in lieu of low density ethylene polymer and that the agitation of the system with the autoclave temperature set to 60° to 65° C. being set to 2 hours in lieu of one hour.

This graft polymerization preformer was rendered into film in the same manner as in Example 1, and the content in the styrene polymer was calculated. It was 29.5% by weight.

Further, this graft polymerization preformer was subjected to extraction in the same manner as in Example 1 to extract styrene polymer, and the active oxygen content therein was measured. It was 0.13% by weight.

Further, this graft polymerization preformer was subjected to extraction with xylene in the same manner as in Example 1. Insoluble part in xylene was found.

(Reference Example 9)

Grafting reaction was caused in the same manner as in Reference Example 1 except for that what was obtained in Example 20 was used as graft polymerization preformer.

The product system of the grafting reaction was subjected to extraction in a soxhlet extractor with styrene polymer. The extracted styrene polymer was 5.9% by weight with respect to the total amount.

Thus, the grafting efficiency of styrene polymer was calculated to be 80.3% by weight. In the extraction with xylene, the insoluble part in xylene was 22.3% by weight.

(Comparative Example 20)

A graft polymerization preformer was manufactured in the same manner as in Example 20 except for t-butylperoxymethacryloyloxyethyl carbonate was not used. Of this graft polymerization preformer, the styrene polymer, active carbon and insoluble part in xylene contents were measured in the same manner as in Example 20. They are respectively 29.3, 0 and 0% by weight.

Further, this graft polymerization preformer was subjected to grafting reaction in the same manner as in Reference Example 1, and the grafting efficiency was obtained. The grafting efficiency was 0% by weight. No grafting capacity was found.

(Comparative Example 21)

A graft polymerization preformer was manufactured in the same manner as in Example 20 except for dicumylperoxide was used in lieu of t-butylperoxymethacryloyloxyethyl carbonate.

In this case, the styrene polymer, active oxygen and insoluble part in xylene contents were respectively 29.3, 0.03 and 0% by weight.

The active oxygen content of 0.03% by weight is though to be due to the facts that dicumyl peroxide extracted by ethyl acetate is dissolved in a solvent based on ethanol and ethyl acetate as re-precipitation solvent. Solvent and distributed ethylene-ethyl acrylate copolymer during the polymerization. This graft polymerization preformer was analyzed in the manner as in Reference Example 1.

The grafting efficiency with respect to ethylene-ethyl acrylate copolymer and styrene polymer was 0.8% by weight. Substantially no grafting reaction due to dicumyl peroxide occurred. The insoluble part in xylene content was 29.7% by weight.

(Example 21)

A graft polymerization preformer was manufactured in the same manner as in Example 20 except for that 300 g of methyl methacrylate was used in lieu of 300 g of styrene.

The content of methyl methacrylate polymer was obtained from the yield of this graft polymerization preformer. It was 28.5% by weight. The active oxygen and insoluble part in xylene contents were 0.11 and 0.1% by weight.

(Reference Example 10)

The graft polymerization preformer as obtained in Example 21 was subjected to grafting reaction. the grafting efficiency of the methyl methacrylate polymer was 7.07% by weight.

(Comparative Example 22)

2.500 g was charged into a stainless steel autoclave with a volume of 5 l. Further, 2.5 g of polyvinyl alcohol was dissolved as a suspension agent to the solution was added a mixture consisting of 1.000 g of styrene, 5 g of benzoyl peroxide and 20 g of t-butylperoxymethacryloyloxyethyl carbonate. The admixture was subjected to polymerization at 80° to 85° C. for 7 hours to obtain a peroxy-group-containing styrene polymer composition. 5 g of peroxy-group-containing styrene polymer composition was dissolved in benzene, and the resultant solution was charged into methanol, thereby removing non-copolymerized peroxide to obtain a peroxy-group-containing styrene polymer. This polymer was substantially the same as what is obtained in Example 20 and contained 0.13% by weight of active oxygen. Then, 70 parts by weight of ethylene-ethyl acrylate used in Example 20 and 30 parts by weight of the peroxy-group-containing styrene polymer were mixed together, and the resultant mixture was subjected to grafting reaction in the same manner as in Reference Example 1. The grafting efficiency of the styrene polymer was 0% by weight, and the non-dissolved xylene content was 31.5% by weight. Substantially all of insoluble part in xylene was constituted by self-bridged styrene polymer.

In this case, no grafting reaction occurred, and only inter-molecular bridging reaction of styrene polymer occurred.

(Example 22)

A graft polymerization preformer was prepared in the same manner as in Example 20 except for that 300 g of vinyl acetate was used in lieu of 300 g of styrene and 6 g of t-butylperoxyallyl carbonate in lieu of 6 g of t-butylperoxymethacryloyloxyethyl carbonate. The content of vinyl acetate polymer was obtained from the yield of this graft polymerization performer. It was 28.4% by weight. Further, this graft polymerization preformer was subjected to extraction with methanol at room temperature for 7 days to extract vinyl acetate polymer. The extracted vinyl acetate polymer was charged into petroleum ether to obtain vinyl acetate polymer powder.

The active oxygen content in the vinyl acetate polymer was 0.15% by weight. Also, the graft polymerization preformer contained 1.9% by weight of insoluble part in xylene.

(Reference Example 11)

Grafting reaction was caused in the same manner as in Reference Example 1 except for that what was obtained in Example 22 was used as graft polymerization preformer and methanol was used in lieu of ethyl acetate as extraction solvent for calculating the grafting efficiency.

The grafting efficiency was 74.4% by weight.

(Example 23)

A graft polymerization preformer was obtained in the same manner as in Example 20 except for that 225 g of styrene and 75 g of acrylonitrile were used as vinyl monomer.

The content of styrene-acrylonitrile copolymer was obtained from the yield of the graft polymerization preformer.

It was 29.1% by weight. The active oxygen content in styrene-acrylonitrile copolymer as measured in the same manner as in Example 20 was 0.13% by weight.

The insoluble part in xylene content was 0.3% by weight.

(Reference Example 12)

Grafting reaction was caused in the same manner as in Reference Example 1 except for that what was obtained in Example 23 was used in lieu of Graft polymerization preformer.

The grafting efficiency was 77.1% by weight.

(Example 24)

A graft polymerization preformer was prepared in the same manner as in Example 20 except for that lauroyl peroxide (available under a trade name "Perroyl L" manufactured by Nippon Yushi Co., Ltd. with a 10-hour half reduction period temperature of 62° C.) was used in lieu of benzoyl peroxide as radical polymerization initiator and that correspondingly the polymerization temperature and time were set to 70° to 75° C. and 9 hours, respectively.

This graft polymerization preformer had a composition consisting of 28.9% by weight of styrene polymer, 0.13% by weight the active oxygen content of styrene polymer and 0.1% by weight of insoluble part in xylene.

(Comparative Example 23)

A graft polymerization preformer was obtained in the same manner as in Example 20 except for that t-butylperoxybenzoate (available under a trade name "Perbutyl Z" manufactured by Nippon Yushi Co., Ltd. with a 10-hour half reduction period temperature of 104° C.) was used in lieu of benzoyl peroxide as radical polymerization initiator and that the polymerization temperature and time were set to 120° C. and 6 hours.

The graft polymerization preformer contained 89% by weight of insoluble part in xylene.

This is thought to be due to the occurrence of intermolecular bridging with decomposition of t-butylperoxymethacryloyloxyethyl carbonate during the polymerization.

(Example 25)

A graft polymerization reformer was obtained in the same manner as in Example 20 except for that a copolymer consisting of 95% by weight of ethylene and 5% by weight of ethyl acrylate (available under a trade name "Nisseki Rekusuron EEA A-3050" manufactured by Nippon Sekiyu Kagaku Co., Ltd.) was used in lieu of ethylene-ethyl acrylate copolymer. The content of styrene polymer was obtained from the yield of this graft polymerization preformer.

It was 28.5% by weight. The active oxygen content in styrene polymer as measured in the same manner as in Example 20 was 0.12% by weight.

(Example 26 to 29)

Graft polymerization preformers were prepared in the same manner as in Example 20 except for that the amounts of ethylene-ethyl acrylate copolymer, styrene, benzoyl peroxide and t-butylperoxymethacryloyloxyethyl carbonate were varied as shown in Table 5.

These graft polymerization preformers were subjected to grafting reaction in the same manner as in Reference Example 1, and the grafting efficiency and insoluble part in xylene contents of the resultant grafted systems were measured.

The results are shown in Table 5.

(Comparative Example 24 to 27)

Graft polymerization preformers were prepared in the same manner as in Example 20 except for that the amounts of ethylene-ethyl acrylate copolymer, styrene, benzoyl peroxide, t-butylperoxymethacryloyloxyethyl carbonate were varied as shown in Table 6.

These graft polymerization performers were subjected to grafting reaction in the same manner as in Reference Example 1, and the grafting efficiency and insoluble part in xylene contents in the resultant grafted systems were measured. The results are as shown in Table 6.

(Comparative Example 28)

A graft polymerization preformer was prepared in the same manner as in Example 20 except for that cumylperoxyncodecanoate (available under a trade name "Percumyl ND" manufactured by Nippon Yushi Co., Ltd. with a 10-hour half reduction period temperature of 36.6° C.) was used in lieu of benzoyl peroxide as radical polymerization initiator and that correspondingly the impregnation temperature and time were respectively set to 35° C. and 2 hours and the polymerization temperature was set to 60° C.

This graft polymerization preformer had its surface covered by a transparent resin, and what was in the powdery form, constituted by sole styrene polymer (impregnated polymerized graft polymerization preformer being in the form of pellets) reached 54% by weight of the charged amount of styrene.

This graft polymerization preformer was subjected to grafting reaction in the same manner as in Reference Example 1.

The grafting efficiency was 10.7% by weight.

(Example 30)

A graft polymerization preformer was obtained through polymerization caused in the same manner as in Example 1 except for that ethylene-vinyl acetate copolymer (available under a trade name "Nisseki Rekusuron Eva V-270" manufactured by Nippon Sekiyu Co., Ltd. containing 15% by weight of vinyl acetate and in the form of pellets) was used in lieu of low density ethylene polymer and that the agitation of the system with the autoclave temperature set to 60° to 65° C. being set to 2 hours in lieu of one hour.

This graft polymerization preformer was rendered into film in the same manner as in Example 1, and the content in the styrene polymer was calculated. It was 29.6% by weight.

Further, this graft polymerization preformer was subjected to extraction in the same manner as in Example 1 to extract styrene polymer, and the active oxygen content therein was measured. It was 0.12% by weight.

Further, this graft polymerization preformer was subjected to extraction with xylene in the same manner as in Example 1. Insoluble part in xylene was found.

(Reference Example 13)

Grafting reaction was caused in the same manner as in Reference Example 1 except for that what was obtained in Example 30 was used as graft polymerization preformer.

The product system of the grafting reaction was subjected to extraction in a soxhlet extractor with ethyl acetate to extract non-grafted styrene polymer.

The extracted styrene polymer was 5.7% by weight with respect to the total amount.

Thus, the grafting efficiency of styrene polymer was calculated to be 81% by weight. In the extraction with xylene, the insoluble part in xylene content was 23.7% by weight.

(Comparative Example 29)

A graft polymerization preformer was prepared in the same manner as in Example 30 except for that t-butylperoxymethacryloyloxyethyl carbonate was not used.

Of this graft polymerization preformer, the styrene polymer, active oxygen and insoluble part in xylene contents were measured in the same manner as in Example 30.

They were respectively 29.5, 0 and 0% by weight.

Further, this graft polymerization preformer was subjected to grafting reaction in the same manner as in Reference Example 1 to obtain the grafting efficiency. The grafting efficiency was 0.3% by weight, and there was no grafting capacity.

(Comparative Example 30)

A graft polymerization preformer was prepared in the same manner as in Example 30 except for that dicumyl peroxide was used in lieu of t-butylperoxymethacryloyloxyethyl carbonate.

At this time, the contents of styrene polymer, active oxygen and insoluble part in xylene were 29.6, 0.03 and 0% by weight.

The active oxygen content of 0.03% by weight is thought to be due to the fact that dicumyl peroxide extracted by ethyl acetate is dissolved in a solvent based on methanol and ethyl acetate as re-precipitation solvent and is distributed in ethylene-vinyl acetate copolymer during the polymerization.

This graft polymerization preformer was analyzed in the same manner as in Reference Example 1. The grafting efficiency with respect to ethylene-vinyl acetate copolymer and styrene polymer was 1.2% by weight, and substantially no grafting reaction due to dicumyl peroxide occurred.

The insoluble part in xylene content was 32.4% by weight.

(Example 31)

A graft polymerization preformer was prepared in the same manner as in Example 30 except for that 300 G of methyl methacrylate was used in lieu of 300 g of styrene.

The content of methyl methacrylate polymer was measured from the yield of graft polymerization preformer.

It was 29.1% by weight. The contents of active oxygen and insoluble part in xylene were 0.12 and 0.3% by weight.

(Reference Example 14)

The graft polymerization preformer obtained in Example 31 was subjected to grafting in the same manner as in Reference Example 12. The grafting efficiency of methyl methacrylate polymer was 72.1% by weight.

(Comparative Example 31)

2,500 g of pure water was charged into a stainless steel autoclave with a volume of 5 liters, and 2.5 G of polyvinyl alcohol was dissolved as suspension agent. To the solution was added a mixture consisting of 1,000 g of styrene, 5 g of benzoyl peroxide and 20 g of t-butylperoxymethacryloyloxyethyl carbonate. The admixture was subjected to polymerzation at 80° to 85° C. for 7 hours to obtain a peroxy-group-containing styrene copolymer.

5 g of the polymer composition was dissolved in benzene.

The resultant solution was charged into methanol to remove peroxide remaining without being copolymerized to obtain peroxy-group-containing styrene copolymer. This styrene polymer was substantially the same one obtained in Example 30, and the active oxygen content in it was 0.12% by weight.

Then, 70 parts by weight of ethylene-vinyl acetate copolymor used in EXample 30 and 30 parts by weight of the peroxy-group-containing styrone copolymer as noted above were mixed together, and the resultant mixture was subjected to grafting reaction in the same manner as in Reference Example 13.

The grafting efficiency of styrene copolymer was 0.2% by weight, and the insoluble part in xylene content was 34.1% by weight.

Substantially all of the non-dissolved content was self-bridged styrene copolymer.

In other words, in this case no grafting reaction occurred, and only inter-molecular bridging of styrene copolymer occurred.

(Example 32)

A graft polymerization preformer was prepared in the same manner as in Example 30 except for that 300 g of vinyl acetate was used in lieu of 300 g of styrene and 6 g of t-butylperoxyallyl carbonate was used in lieu of 6 g of t-butylperoxymethacryloyloxyethyl carbonate.

The content of vinyl acetate polymer was measured from the yield of this graft polymerization preformer. It was 28.8% by weight.

Further, this graft polymerization preformer was subjected to extraction with methanol at room temperature for 7 days to extract vinyl acetate polymer.

The extracted vinyl acetate polymer was charged into petroleum ether to obtain vinyl acetate polymer powder.

The active oxygen content in this vinyl acetate polymer was 0.14% by weight, and the insoluble part in xylene content of this graft polymerization preformer was 1.8% by weight.

(Reference Example 15)

Grafting reaction was caused in the same manner as in Reference Example 13 except for that what was obtained in Example 32 as graft polymerization preformer and that methanol was used in lieu of ethyl acetate as extraction solvent for calculating the grafting efficiency. The grafting efficiency was 82.3% by weight.

(Example 33)

A graft polymerization preformer was prepared in the same manner as in Example 30 except for that 225 g of styrene and 75 g of acrylonitrile were used as vinyl monomer.

The content of styrene-acrylonitrile copolymer was obtained from the yield of this graft polymerization preformer.

It was 29.4% by weight. The active oxygen content of styrene-acrylonitrile copolymer as measured in the same manner as in Example 30 was 0.12% by weight, and the insoluble part in xylene content was 0.1% by weight.

(Reference Example 16)

Grafting reaction was caused in the same manner as in Reference Example 13 except for that what was obtained in Example 33 was used as graft polymerization preformer. The grafting efficiency was 78.6% by weight.

(Example 34)

A graft polymerization preformer was obtained in the same manner as in Example 30 except for that lauroyl poroxido (available under a trade name "Perroyl L" manufactured by Nippon Yushi Co., Ltd. with a 10-hour half reduction period temperature of 62° C.) was used in lieu of benzoyl peroxide as radical polymerization initiator and that correspondingly the polymerization temperature and time were set respectively to 70° to 75° C. and 9 hours. This graft polymerization preformer had a composition consisting of 29.1% by weight of styrene polymer, 0.13% by weight of the active oxygen content in styrene polymer and 0.3% by weight of insoluble part in xylene.

(Comparative Example 32)

A graft polymerization preformer was prepared in the same manner as in Example 30 except for that t-butylperoxy benzoate (available under a trade name "Perbutyl Z" manufactured by Nippon Yushi Co., Ltd. with a 10-hour half reduction period temperature of 104° C.) was used in lieu of benzoyl peroxide as radical polymerization initiator.

This graft polymerization preformer contained 92% by weight of insoluble part in xylene. This is thought to be due to presumable occurrence of intermolecular bridging caused with decomposition of t-butylperoxymethacryloyloxyethyl carbonate during the polymerization.

(Example 35)

A graft polymerization preformer was prepared in the same manner as in Example 30 except for that a copolymer consisting of 73% by weight of ethylene and 28% by weight of vinyl acetate (available under a trade name "Evaflex 260" manufactured by Mitsui Polychemical Co., Ltd.) was used in lieu of ethylenevinyl acetate copolymer.

The content of styrene polymer was obtained from the yield of the graft polymerization preformer. It was 29.7% by weight.

The active oxygen content in styrene polymer measured in the same manner as in Example 30 was 0.13% by weight.

(Examples 36 to 39)

Graft polymerization preformers were prepared in the same manner as in Example 30 except for that the amounts of ethylene-vinyl acetate copolymer, styrene, benzoyl peroxide and t-butylperoxymethacryloyloxyethyl carbonate were varied as in Table 7.

These graft polymerization preformers were subjected to grafting reaction in the same manner as in Reference Example 13, and the grafting efficiency and insoluble part in xylene contents of the resultant grafted systems were measured. The results are as shown in Table 7.

(Comparative Examples 33 to 36)

Graft polymerization preformers were prepared in the same manner as in Example 30 except for that the amounts of ethylene-vinyl acetate copolymer, styrene, benzoyl peroxide and t-butylperoxymethacryloyloxyethyl carbonate were varied as in Table 8.

These graft polymerization preformers were subjected to grafting reaction in the same manner as in Reference Example 13. The grafting efficiency and insoluble part in xylene contents of the resultant grafted systems were measured. The results are as shown in Table 8.

(Comparative Example 37)

A graft polymerization preformer was prepared in the same manner as in Example 30 except for that cumylperoxyneodocanoate (available under a trade name "Percumyl ND" manufactured by Nippon Yushi Co., Ltd. with a 10-hour half reduction period temperature of 36.6° C.) was used in lieu of benzoyl peroxide as radical polymerization initiator and that correspondingly the impregnation temperature and time were set to 35° C. and 2 hours and the polymerization temperature to 60° C.

This graft polymerization preformer had its surface covered by a transparent resin. Further, what was in the powdery form, constituted by sole styrene polymer (impregnated polymerized graft polymerization preformer) reached 57% by weight of the charged amount of styrene.

This graft polymerization preformer was subjected to grafting reaction in the same manner as in Reference Example 13. The grafting efficiency was 13.8% by weight.

(Example 40)

A graft polymerization preformer was prepared in the same manner as in Example 1 except for that ethylene-propylene-diene copolymer rubber (available under a trade name "Mitsui Elastomer K-9720" manufactured by Mitsui Sekiyu Kagaku Kogyo Co., Ltd. with Mooney viscosiy (ML I+4,100° C.) of 40 and iodization of 22, in the form of pellets) was used in lieu of low density ethylene polymer and that agitation of the system with the autoclave held at 60° to 65° C. was done for 2 hours in lieu of one hour.

This graft polymerization preformer was rendered into film in the same manner as in Example 1, and the styrene polymer content was calculated. It was 29.2% by weight.

The graft polymerization preformer was subjected to extraction in the same manner as in Example 1 to extract styrene polymer.

The measured active oxygen content was 0.13% by weight.

The graft polymerization performer was extracted with xylene in the same manner as in Example 1. Insoluble part in xylene was found.

(Reference Example 17)

Grafting reaction was caused in the same manner as in Reference Example 1 except for that what was obtained in Example 40 was used as graft polymerization preformer.

This graft polymerization preformer was subjected to extraction in a soxhlet extractor with ethyl acetate to extract non-grafted styrene polymer. The extracted styrene polymer was 5.1% by weight with respect to the total amount.

Thus, the grafting efficiency of styrene polymer was calculated to be 83% by weight. In the extraction with xylene, the insoluble part in xylene content was 17.2% by weight.

The grafting efficiency represents the ratio of grafted polystyrene to total polymerized polystyrene.

(Comparative Example 38)

A graft polymerization preformer was prepared in the same manner as in Example 40 except for that t-butylperoxymethacryloyloxyethyl carbonate was not used.

Of this graft polymerization preformer the styrene polymer, active oxygen and insoluble part in xylene contents were measured in the same manner as in Example 40. They were respectively 29.0, and 0% by weight.

Further, this graft polymerization preformer was subjected to grafting reaction in the same manner as in Reference Example 17. The grafting efficiency was 0.1% by weight, and there was substantially no grafting capacity.

(Comparative Example 39)

A graft polymerization preformer was prepared in the same manner as in Example 40 except for that dicumyl peroxide was used in lieu of t-butylperoxymethacroyloxyethyl carbonate.

In this case, the styrene polymer, active oxygen and insoluble part in xylene contents were respectively 29.4, 0.04 and 0% by weight.

The active oxygen content of 0.04% by weight is though to be due to the fact that dicumyl peroxide extracted with ethyl acetate is dissolved in a solvent based on methanol and ethyl acetate as reprecipitation solvent and distributed in ethylene-propylene-diene copolymer rubber in the polymerization.

This graft polymerization preformer was analyzed in the same manner as in Reference Example 17. The grafting efficiency with respect to ethylene-propylene-diene copolymer and styrene polymer was 1.6% by weight. Substantially no grafting reaction due to dicumyl peroxide occurred.

The insoluble part in xylene content was 41.5% by weight.

(Example 41)

A graft polymerization preformer was prepared in the same manner as in Example 40 except for that 300 g of methyl methacrylate was used in lieu of 300 g of styrene.

The content of methyl methacrylate polymer was measured from the yield of this graft polymerization preformer. It was 28.7% by weight. The active oxygen and insoluble part in xylene contents were respectively 0.12 and 0.4% by weight.

(Reference Example 18)

The graft polymerization preformer obtained in Example 41 was subjected to grafting in the same manner as in Reference Example 17. The grafting efficiency of methyl methacrylate was 68.5% by weight.

(Comparative Example 40)

2,500 g of pure water was charged into a stainless steel autoclave with a volume of 5 liters, and 2.5 g of polyvinyl alcohol was dissolved as suspension agent. To this solution was added a mixture consisting of 1,000 g of styrene, 5 g of benzoyl peroxide and 20 g of t-butyl-peroxymethacryloyloxyethyl carbonate, and the admixture was subjected to polymerization at 80° to 85° C. for 7 hours to obtain a peroxy-group-containing styrene copolymer.

5 g of this polymer composition was dissolved in benzene, and then the resultant solution was charged into methanol to remove peroxide remaining without being polymerized. Substantially the same styrene polymer as obtained in Example 40 was formed, and its active oxygen content was 0.12% by weight.

Subsequently, 70 parts by weight of ethylene-propylene-diene copolymer and used in Example 40 and 30 parts by weight of the peroxy-group-containing styrene copolymer noted above were mixed together, and the resultant mixture was subjected to grafting reaction in the same manner as in Reference Example 17.

The grafting efficiency of the styrene copolymer was 0.3% by weight, and the insoluble part in xylene content was 30.5% by weight. The non-dissolved content was substantially self-bridged styrene copolymer. In this case, no grafting reaction occurred, and only intermolecular bridging of styrene copolymer occurred.

(Example 42)

A graft polymerization preformer was prepared in the same manner as in Example 40 except for that 300 g of vinyl acetate was used in lieu of 300 g of styrene and 6 g of t-butylperoxyallyl carbonate in lieu of 8 g of t-butylperoxymethacryloyloxyethyl carbonate.

The content of vinyl acetate polymer was measured from the yield of this graft polymerization preformer. It was 29.1% by weight. Further, this graft polymerization preformer was extracted with methanol at room temperature for 7 days to extract vinyl acetate polymer. The extracted vinyl acetate polymer was charged into petroleum ether to obtain vinyl acetate polymer powder. The active oxygen content in this vinyl acetate polymer was 0.13% by weight, and the insoluble part in xylene content in this graft polymerization preformer was 1.6% by weight.

(Reference Example 19)

Grafting reaction was caused in the same manner as in Reference Example 17 except for that what was obtained in Example 42 was used as graft polymerization preformer and that methanol was used in lieu of ethyl acetate as extraction solvent when calculating the grafting efficiency. The grafting efficiency was 84.9% by weight.

(Example 43)

A graft polymerization preformer was obtained in the same manner as in Example 40 except for that 225 g of styrene and 75 g of acrylonitrile were used as vinyl monomer.

The content of styrene-acrylonitrile copolymer was calculated from the yield of this graft polymerization preformer. It was 29.5% by weight. The active oxygen content in the styrene-acrylonitrile copolymer as measured in the same manner as in Example 40 was 0.13% by weight. The insoluble part in xylene content was 0.2% by weight.

(Reference Example 20)

Graft reaction was caused in the same manner as in Reference Example 17 except for that what was used in Example 43 was used as graft polymerization preformer. The grafting efficiency was 77.3% by weight.

(Example 44)

A graft polymerization preformer was obtained in the same manner as in Example 40 except for that lauroyl peroxide (available under a trade name "Perroyl L" manufactured by Nippon Yushi Co., Ltd. with a 10-hour half reduction period temperature of 62° C. was used in lieu of benzoyl peroxide as radical polymerization initiator and that the polymerization temperature and time were respectively set to 70° to 75° C. and 9 hours. This graft polymerization preformer had a composition consisting of 28.9% by weight of styrene polymer, 0.13% by weight of active oxygen contained in styrene polymer and 0% by weight of insoluble part in xylene.

(Comparative Example 41)

A graft polymerization preformer was obtained in the same manner as in Example 40 except for that t-butylperoxybenzoate (available under a trade name "Perbutyl Z" manufactured by Nippon Yushi Co., Ltd. with a 10-hour half reduction period temperature of 104° C.) was used in lieu of benzoyl peroxide as radical polymerization initiator and that the polymerization temperature and time were respectively set to 120° C. and 6 hours.

This graft polymerization preformer contained 95% by weight of insoluble part in xylene. This is thought to be due to inter-molecular bridging caused with decomposition of t-butylperoxymethacryloyloxyethyl carbonate.

(Example 45)

A graft polymerization preformer was obtained in the same manner as in Example 40 except for that ethylene-propylene copolymer rubber (available under a trade name "Mitsui EPT #0045" manufactured by Mitsui Sekiyu Kagaku Kogyo Co., Ltd. with a Mooney viscosity (ML I-100° C.) of 40 was used in lieu of ethylene-propylene copolymer rubber.

The content of styrene polymer was calculated from the yield of this graft polymerization preformer. It was 28.9% by weight. The active oxygen content of styrene polymer as measured in the same manner as Example 40 was 0.13% by weight.

(Examples 46 to 49)

Graft polymerization preformers were prepared in the same manner as in Example 40 except for that the amounts of ethylene-propylene-diene copolymer rubber, styrene, benzoyl peroxide and t-butylperoxymethacryloyloxyethyl carbonate were varied as in Table 9. These graft polymerization preformers were subjected to grafting reaction in the same manner as in Reference Example 17, and the grafting efficiency and insoluble part in xylene content of the resultant grafted systems were measured. The results are as shown in Table 9.

(Comparative Example 42 to 45)

A graft polymerization preformer was obtained in the same manner as in Example 40 except for that the amounts of ethylene-propylene-diene copolymer rubber, styrene, benzoyl peroxide and t-butylperoxymethacryloyloxyethyl carbonate were varied as in Table 10. These graft polymerization preformers were subjected to grafting reaction in the same manner as in Reference Example 16. The grafting efficiency and insoluble part in xylene content of the resultant grafted systems were measured. The results are as shown in Table 10.

(Comparative Example 46)

A graft polymerization preformer was obtained in the same manner as in Example 40 except for that cumylperoxyneodecanoate (available under a trade name "Percumyl ND" manufactured by Nippon Yushi with a 10-hour half reduction period temperature of 36.36° C.) was used in lieu of benzoyl peroxide as radical polymerization initiator and that correspondingly the impregnation temperature and time were respectively set to 35° C. and 2 hours and the polymerization temperature to 60° C. This graft polymerization preformer has its surface covered by a transparent resin. Further, what was in the powdery form, constituted by sole styrene polymer (impregnated polymerized graft polymerization preformer being in the form of pellets) reached 69% by weight of the charged amount of styrene.

This graft polymerization preformer was subjected to grafting reaction in the same manner as in Reference Example 16. The grafting efficiency was 16.1% by weight.

TABLE 1

| | EXAMPLE | 6 | 7 | 8 | 9 |
|---|---|---|---|---|---|
| Mixing ratio of | Low density Polyethylene | 70 | 70 | 70 | 25 |
| graft polymerization | Styrene | 30 | 30 | 30 | 75 |
| preformer | Benzoyl Peroxide | 0.15 | 0.15 | 0.9 | 0.38 |
| (part by weight) | t-Butylperoxymetha Cryloyloxyethyl Carbonate | 0.15 | 1.5 | 0.15 | 1.5 |
| Analysis data for | Styrene system | 28 | 29 | 29 | 63 |

TABLE 1-continued

| EXAMPLE | | 6 | 7 | 8 | 9 |
|---|---|---|---|---|---|
| Graft polymerization (% by weight) | Polymer Content Insoluble part in Xylene | 0 | 3 | 3 | 0 |
| | Active oxygen part Styrene system polymer | 0.03 | 0.32 | 0.03 | 0.13 |
| Analysis data for grafted polymer (% by weight) | Grafting efficiency | 43 | 73 | 47 | 30 |
| | Insoluble part in Xylene | 3.7 | 23 | 2.9 | 12 |

TABLE 2

| Comparative Example | | 6 | 7 | 8 | 9 |
|---|---|---|---|---|---|
| Mixing ratio of graft polymerization preformer (part by weight) | Low density Polyethylene | 70 | 70 | 70 | 10 |
| | Styrene | 30 | 30 | 30 | 90 |
| | Benzoyl Peroxide | 0.15 | 0.15 | 2.4 | 0.45 |
| | t-Butylperoxymetha Cryloyloxymethyl Carbonate | 0.02 | 4.5 | 0.15 | 1.8 |
| Analysis data for Graft polymerization (% by weight) | Styrene system Polymer Content | 29 | 30 | 29 | 68 |
| | Insoluble part in Xylene | 0 | 65 | 53 | 2 |
| | Active oxygen part Styrene system polymer | 0.005 | 0.95 | 0.03 | 0.03 |
| Analysis data for grafted polymer (% by weight) | Grafting efficiency | 2 | — | — | 70 |
| | Insoluble part in Xylene | 0 | — | — | 5 |

—: Incapable of measurement

TABLE 3

| EXAMPLE NO. | | 16 | 17 | 18 | 19 |
|---|---|---|---|---|---|
| Epoxy group containing ethylene copolymer (part by weight) | | 70 | 70 | 70 | 25 |
| Styrene (part by weight) | | 30 | 30 | 30 | 75 |
| Benzoylperoxide (part by weight) | | 0.15 | 0.15 | 0.9 | 0.38 |
| MEC (part by weight) | | 0.15 | 1.5 | 0.15 | 1.5 |
| Performer of graft copolymer | PS Content (% by weight) | 28 | 28.5 | 28.5 | 62.3 |
| | Insoluble part in Xylene (% by weight) | 0.1 | 0.2 | 0.1 | 0 |
| | PS active Oxygen Content (% by weight) | 0.03 | 0.29 | 0.03 | 0.13 |
| Grafting efficiency (% by weight) | | 41.5 | 85.3 | 40.3 | 38.7 |
| Insoluble part in xylene (% by weight) | | 5.1 | 25.3 | 3.8 | 16.5 |

MEC: t-Butylperoxymethacryloryethylcarbonate
PS: Styrene copolymer

TABLE 4

| Comparative Example | | 15 | 16 | 17 | 18 |
|---|---|---|---|---|---|
| Epoxy group containing ethylene copolymer (part by weight) | | 70 | 70 | 70 | 70 |
| Styrene (part by weight) | | 30 | 30 | 30 | 90 |
| Benzoylperoxide (part by weight) | | 0.15 | 0.15 | 2.4 | 0.45 |
| MEC (part by weight) | | 0.02 | 4.5 | 0.15 | 1.8 |
| Performer of graft copolymer | PS Content (% by weight) | 28.3 | 28.5 | 28.1 | 67.9 |
| | Insoluble part in Xylene (% by weight) | 0.1 | 74.5 | 61.0 | 0 |
| | PS active Oxygen Content (% by weight) | 0.005 | 0.91 | 0.03 | 0.03 |
| Grafting efficiency (% by weight) | | 3.2 | — | — | 67.2 |
| Insoluble part in xylene (% by weight) | | 1.3 | | | 14.2 |

MEC: t-Butylperoxymethacryloryethylcarbonate
PS: Styrene copolymer
—: Incapable of measurement

TABLE 5

| EXAMPLE | | 26 | 27 | 28 | 29 |
|---|---|---|---|---|---|
| Mixing ratio of graft polymerization preformer (part by weight) | Ethylene-Acrylic-Acid Copolymer | 70 | 70 | 70 | 25 |
| | Styrene | 30 | 30 | 30 | 75 |
| | Benzoyl Peroxide | 0.15 | 0.15 | 0.9 | 0.38 |
| | t-Butylperoxymetha Cryloyloxyethyl Carbonate | 0.15 | 1.5 | 0.15 | 1.5 |
| Analysis data for Graft polymerization (% by weight) | Styrene system Polymer Content | 29.3 | 29.1 | 29.1 | 69.5 |
| | Insoluble part in Xylene | 0.2 | 0.5 | 0.3 | 0.1 |
| | Active oxygen part Styrene system polymer | 0.03 | 0.31 | 0.02 | 0.12 |
| Analysis data for grafted polymer (% by weight) | Grafting efficiency | 43.4 | 82.3 | 43.5 | 49.7 |
| | Insoluble part in Xylene | 8.9 | 28.7 | 9.4 | 19.2 |

TABLE 6

| Comparative Example | | 24 | 25 | 26 | 27 |
|---|---|---|---|---|---|
| Mixing ratio of graft polymerization preformer (part by weight) | Ethylene-Acrylic-Acid Copolymer | 70 | 70 | 70 | 10 |
| | Styrene | 30 | 30 | 30 | 90 |
| | Benzoyl Peroxide | 0.15 | 0.15 | 2.4 | 0.45 |
| | t-Butylperoxymetha Cryloyloxyethyl Carbonate | 0.02 | 4.5 | 0.15 | 1.8 |
| Analysis data for Graft polymerization (% by weight) | Styrene system Polymer Content | 29.5 | 28.3 | 29.0 | 70.3 |
| | Insoluble part in Xylene | 0.3 | 56.7 | 53.4 | 0 |
| | Active oxygen part Styrene system polymer | 0.006 | 0.87 | 0.03 | 0.11 |
| Analysis data for grafted polymer (% by weight) | Grafting efficiency | 5.4 | — | — | 57.1 |
| | Insoluble part in Xylene | 3.6 | — | — | 11.3 |

—: Incapable of measurement

TABLE 7

| EXAMPLE | | 36 | 37 | 38 | 39 |
|---|---|---|---|---|---|
| Mixing ratio of graft polymerization preformer (part by weight) | Ethylene-Vinylacetate Copolymer | 70 | 70 | 70 | 25 |
| | Styrene | 30 | 30 | 30 | 75 |
| | Benzoyl Peroxide | 0.15 | 0.15 | 0.9 | 0.38 |
| | t-Butylperoxymetha Cryloyloxyethyl Carbonate | 0.15 | 1.5 | 0.15 | 1.5 |
| Analysis data for Graft polymerization (% by weight) | Styrene system Polymer Content | 29.8 | 29.4 | 29.6 | 67.8 |
| | Insoluble part in Xylene | 0.3 | 0.7 | 0.1 | 0.4 |
| | Active oxygen part Styrene system polymer | 0.03 | 0.30 | 0.02 | 0.11 |
| Analysis data for grafted polymer (% by weight) | Grafting efficiency | 45.7 | 83.9 | 45.1 | 51.5 |
| | Insoluble part in Xylene | 10.3 | 30.1 | 13.2 | 21.1 |

TABLE 8

| Comparative Example | | 33 | 34 | 35 | 36 |
|---|---|---|---|---|---|
| Mixing ratio of graft polymerization preformer (part by weight) | Ethylene-Vinylacetate Copolymer | 70 | 70 | 70 | 10 |
| | Styrene | 30 | 30 | 30 | 90 |
| | Benzoyl Peroxide | 0.15 | 0.15 | 2.4 | 0.45 |
| | t-Butylperoxymetha Cryloyloxyethyl Carbonate | 0.02 | 4.5 | 0.15 | 1.8 |
| Analysis data for Graft polymerization (% by weight) | Styrene system Polymer Content | 29.7 | 29.1 | 29.6 | 71.5 |
| | Insoluble part in Xylene | 0.2 | 51.3 | 60.6 | 0.3 |
| | Active oxygen part Styrene system polymer | 0.005 | 0.89 | 0.03 | 0.10 |
| Analysis data for grafted polymer (% by weight) | Grafting efficiency | 4.8 | — | — | 53.8 |
| | Insoluble part in Xylene | 4.3 | — | — | 14.9 |

—: Incapable of measurement

TABLE 9

| EXAMPLE | | 46 | 47 | 48 | 49 |
|---|---|---|---|---|---|
| Mixing ratio of graft polymerization preformer (part by weight) | Ethylene-Proprene-Diene Copolymer-rubber | 70 | 70 | 70 | 25 |
| | Styrene | 30 | 30 | 30 | 75 |
| | Benzoyl Peroxide | 0.15 | 0.15 | 0.9 | 0.38 |
| | t-Butylperoxymetha Cryloyloxyethyl Carbonate | 0.15 | 1.5 | 0.15 | 1.5 |
| Analysis data for Graft polymerizaton (% by weight) | Styrene system Polymer Content | 29.5 | 29.1 | 29.3 | 68.7 |
| | Insoluble part in Xylene | 0.4 | 0.7 | 0.9 | 0.8 |
| | Active oxygen part Styrene system polymer | 0.03 | 0.33 | 0.02 | 0.13 |
| Analysis data for grafted polymer | Grafting efficiency | 41.6 | 87.1 | 44.7 | 55.9 |
| | Insoluble part in | 8.9 | 26.7 | 12.5 | 23.4 |

TABLE 9-continued

| EXAMPLE | 46 | 47 | 48 | 49 |
|---|---|---|---|---|
| (% by weight) Xylene | | | | |

TABLE 10

| Comparative Example | | 42 | 43 | 44 | 45 |
|---|---|---|---|---|---|
| Mixing ratio of graft polymerization preformer (part by weight) | Ethylene-Proprene-Diene Copolymer-rubber | 70 | 70 | 70 | 10 |
| | Styrene | 30 | 30 | 30 | 90 |
| | Benzoyl Peroxide t-Butylperoxymetha | 0.15 | 0.15 | 2.4 | 0.45 |
| | Cryloyloxyethyl Carbonate | 0.02 | 4.5 | 0.15 | 1.8 |
| Analysis data for Graft polymerization (% by weight) | Styrene system Polymer Content | 29.1 | 29.3 | 28.7 | 72.3 |
| | Insoluble part in Xylene | 0.4 | 60.4 | 49.2 | 0 |
| | Active oxygen part Styrene system polymer | 0.005 | 0.89 | 0.03 | 0.13 |
| Analysis data for grafted polymer (% by weight) | Grafting efficiency | 7.3 | — | — | 68.6 |
| | Insoluble part in Xylene | 5.5 | — | — | 13.8 |

—: Incapable of measurement

What is claimed is:

1. A graft polymerization preformer obtained by copolymerizing in 100 parts by weight of ethylene homopolymer or copolymer or mixtures thereof, (a) 5 to 400 parts by weight of one or more vinyl monomers selected from a group consisting of vinyl aromatic monomers, acrylic or methacrylic ester monomers or mixtures thereof, acrylonitrile methacrylonitrile and vinyl ester monomers and (b) one or more radical polymerizable organic peroxides represented by a formula

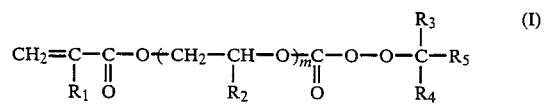

where $R_1$ represents a hydrogen atom or an alkyl group with a carbon number of 1 to 2, $R_2$ a hydrogen atom or a methyl group, $R_3$ and $R_4$ respective alkyl groups with a carbon numbers of 1 to 4, $R_5$ an alkyl, phenyl or alkyl-substituted phenyl group with a carbon number of 1 to 12 or a cycloalkyl group with a carbon number of 3 to 12, and m is 1 or 2, or a formula

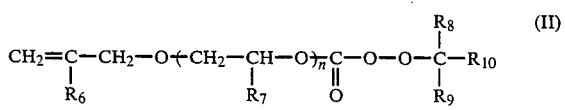

where $R_0$ represents a hydrogen atom or alkyl group with a carbon number of 1 to 4, $R_7$ a hydrogen atom or a methyl group, $R_8$ and $R_9$ represents alkyl groups with carbon number of 1 to 4, $R_{10}$ an alkyl, phenyl or alkyl-substituted phenyl group with carbon number of 1 to 12 or cycloalkyl group with carbon number of 3 to 12, and n being 0, 1 or 2, said (b) being incorporated in 0.1 to 10 parts by weight with respect to 100 parts by weight of said vinyl monomer or monomers, said graft polymerization preformer containing 20 to 95% by weight of ethylene polymer and 80 to 5% by weight of vinyl copolymer, said vinyl copolymer containing 0.01 to 0.73% by weight of active oxygen.

2. The graft polymerization preformer according to claim 1, wherein said ethylene polymer is a low density ethylene polymer with a density of 0.910 to 0.935 g/cm.

3. The graft polymerization preformer according to claim 1, wherein said ethylene polymer is an epoxy-group containing ethylene copolymer obtainable through copolymerization of ethylene and acrylic or methacrylic glycidyl or mixtures thereof.

4. The graft polymerization preformer according to claim 1, wherein said ethylene polymer is ethylene copolymer consisting of ethylene and acrylic or methacrylic ester or mixtures thereof.

5. The graft polymerization preformer according to claim 1, wherein said ethylene polymer is an ethylene copolymer consisting of ethylene and vinyl ester.

6. The graft polymerization preformer according to claim 1, wherein said ethylene polymer is ethylene-propylene copolymer rubber.

7. The graft polymerization preformer according to claim 1, wherein said ethylene polymer is ethylene-propylene-diene copolymer rubber.

8. The graft polymerization preformer according to claim 1, wherein 50 or more % by weight of vinyl monomers polymerized in said ethylene polymer consists of vinyl aromatic monomers.

9. The graft polymerization preformer according to claim 1, wherein 50 or more % by weight of vinyl monomers polymerized in said ethylene polymer consists of acrylic ester monomers.

10. The graft polymerization preformer according to claim 3, wherein said epoxy-group-containing ethylene copolymer is ethylene obtainable through the copolymerization of 60 to 99.5% by weight of ethylene and 0.5 to 40% by weight of acrylic or methacrylic glycidyl or mixtures thereof.

11. The graft polymerization preformer according to claim 4, wherein said ethylene polymer is ethylene copolymer consisting of 50 to 99% by weight of ethylene and 50 to 1% by weight of acrylic or methacrylic ester or mixtures thereof.

12. The graft polymerization preformer according to claim 5, wherein said vinyl ester is vinyl acetate.

13. The graft polymerization preformer according to claim 5, wherein said ethylene polymer consists of 50 to 99% by weight of ethylene and 50 to 1% by weight of vinyl ester.

14. The graft polymerization preformer according to claim 1, wherein said ethylene copolymer is an epoxy-group-containing ethylene copolymer obtained through the copolymerization of ethylene and methacrylic glycidyl.

15. The graft polymerization preformer according to claim 1, wherein said ethylene copolymer is an epoxy-group-containing ethylene copolymer obtained through the copolymerization of ethylene and acrylic glycidyl.

16. The graft polymerization preformer according to claim 1, wherein said ethylene copolymer is an epoxy-group-containing ethylene copolymer obtained through the copolymerization of ethylene and a mixture of methacrylic and acrylic glycidyl.

17. The graft polymerization preformer according to claim 3, wherein said epoxy-group-containing ethylene copolymer is obtained through the copolymerization of 80 to 98% by weight of ethylene and 20 to 2% by weight of a member selected from the group consisting of methacrylic glycidyl, acrylic glycidyl and mixtures thereof.

18. The graft polymerization preformer according to claim 3, wherein said epoxy-group-containing ethylene copolymer is obtained through the copolymerization of 60 to 99.5% by weight of ethylene, ethylene, 0.5 to about 40% by weight of a member selected from the group consisting of methacrylic glycidyl, acrylic glycidyl, and mixtures thereof, and the balance being a member selected from the group consisting of methacrylic ester monomers, acrylic ester monomers, and mixtures thereof.

* * * * *

UNITED STATES PATENT AND TRADEMARK OFFICE
CERTIFICATE OF CORRECTION

PATENT NO. : 4 877 841
DATED : October 31, 1989
INVENTOR(S) : Yasuo MORIYA et al It is certified that error appears in the above-identified patent and that said Letters Patent is hereby corrected as shown below:

Column 36, line 56; delete "ethylene".

Signed and Sealed this

Twelfth Day of March, 1991

Attest:

HARRY F. MANBECK, JR.

Attesting Officer

Commissioner of Patents and Trademarks